Patented Feb. 10, 1942

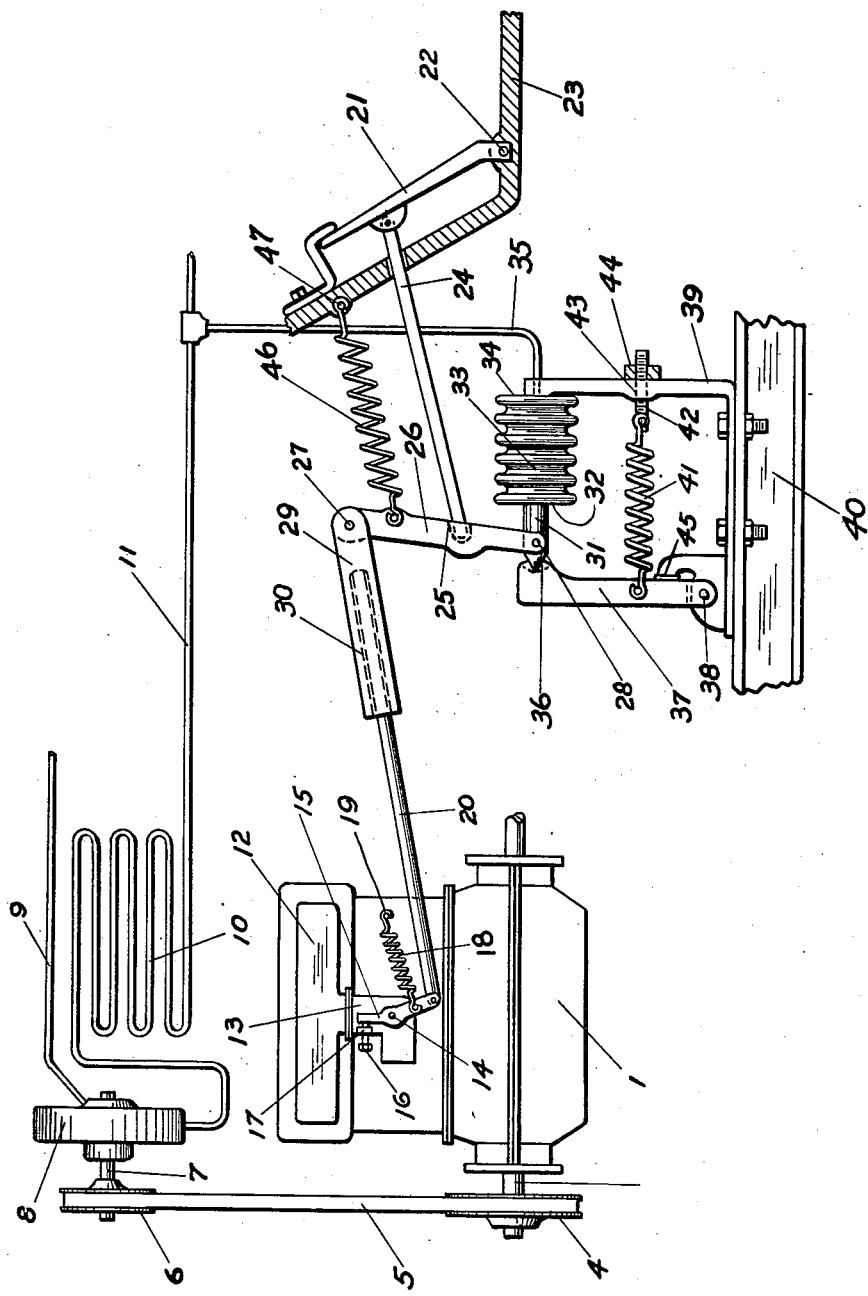

2,272,973

UNITED STATES PATENT OFFICE 2,272,973

CONDENSER PRESSURE CONTROL

Anthony F. Hoesel, Chicago, Ill., assignor to Auto Coolers, Inc., Chicago, Ill., a corporation of Illinois Application March 13, 1940, Serial No. 323,733

3 Claims. (Cl. 62—4)

The present invention relates to air conditioning systems of the compressor-condenser-expander series circuit type for cooling the interior of automobiles. It specifically contemplates the compressor as being operated by the propelling engine and as having a potential capacity in substantially direct relation to the speed of the engine.

Heretofore, such systems tended, during certain conditions, one of which being high engine speed, to generate abnormally high pressures in the condenser, resulting in rapid wear of the compressor moving parts, compressor valve breakage and leakage at the high pressure joints. In certain cases, pressure gauges are installed within eye view of the driver, and it is presumed that, at abnormally high pressures, he would reduce the engine speed sufficiently to allow such pressure to recede to its predetermined safe pressure. This is all right in theory, but, in practice, it has been found that such abnormally high pressures may be generated rather quickly, especially at high traveling speeds, when the driver's attention must be applied to the road; and, therefore, he frequently neglects to scan such pressure gauge, with the result that the system eventually becomes inoperative due to the faults set up by such abnormally high pressures.

In other cases, pressure relief valves are provided, which allow the abnormally high pressure to exhaust into the low pressure expander side of the system; but eventually, due to erosion, these valves become leaky and allow a continuous flow of high pressure vapor into the expander side, thereby reducing the cooling effect of the system even when operating with normal condensing pressures.

An object of the present invention is to provide a control means whereby the build up of abnormally high pressures, within the condenser of an automobile engine operated refrigerant compressor, is prevented.

Since the details and operation of a refrigerating system of the compressor-condenser-expander series circuit type are so well known in the art, the drawing and description are confined only to the particular elements involved.

The drawing shows a diagrammatic, elevational view of an automobile engine driven refrigeration compressor-condenser system embodying a control within the invention.

In the drawing, an automobile engine 2 has a crankshaft 3 upon which is mounted a pulley 4, driving a belt 5, which rotates the pulley 6 mounted upon the driving shaft 7 of a refrigerant vapor compressor 8, which evacuates refrigerant vapor from the suction conduit 9 of a cooling unit, not shown.

The compressor 8 forces the vapor, evacuated from the suction conduit 9, into the condenser 10, wherein it becomes cooled and liquified. The refrigerant liquid is then led to the cooling unit, not shown, by means of the liquid conduit 11 leading from the outlet of the condenser 10.

The engine 1 has an inlet manifold 12, upon which is mounted a carburetor 13, having a throttle valve shaft 14 upon which is fastened the throttle lever 15, which, at its upper end and in its closed position, contacts an adjusting screw 16 threaded into the lug 17, which is integral with the body of the carburetor 13. Adjustment, of the adjusting screw 16, allows the throttling action to be increased or decreased, thereby decreasing and increasing, respectively, the speed of the engine 1.

The throttle lever 15 is constantly urged to its throttling position by means of the tension spring 18, pivoted at 19. Operatively connected to the throttle lever 15, at its lower end, is a push rod 20 which, when moved to the left, opens the throttle valve of the carburetor and allows the engine speed to increase.

The accelerator pedal 21, fulcrumed at 22 on the floor board 23 of the automobile, has operatively connected thereto a push rod 24, which at its left-hand end, fits loosely within the hollow 25 of the floating link 26, fulcrumed at both 27 and 28. The fulcrum 27 connects with a push rod 29, having a blind bore 30 which is a loose fit for the push rod 20. The fulcrum 28 connects with the push rod extension 31, which is a continuation of the sealing head 32 of the bellows 33, which is sealed, at its other end, by means of a sealing head 34, into which conduit 35, leading from the liquid conduit 11, leads.

The push rod extension 31 is pointed, at its end, and engages a hollow 36 at the upper end of the rocking lever 37, which is pivoted at 38 to the stationary support 39 bolted to the automobile framing 40.

The rocking lever 37 is constantly urged toward the right and against the pressure exerted by the bellows 33, by means of the tension spring 41 connected to an adjusting screw 42, which is a loose fit in the bore 43 of the stationary support 39.

A nut 44, in threaded relation with the adjusting screw 42, serves to lengthen or shorten the tension spring 41; thereby necessitating a greater or lesser pressure, respectively, of the bellows 33 in order to effect movement of the rocking lever 37, which, under normal conditions of pressure within the condenser 10 and, consequently, bellows 33, would be in contact with the stop 45 of the stationary support 39.

The floating link 26 is at all times urged, at its upper end, towards the right, by means of the tension spring 46 pivoted at 47 to the floor board 23.

In the drawing, all of the components, forming the control system, are shown in their relative positions whenever the pressure, within the condenser 10 and bellows 33, is within the normal limits and the engine 1 at idling speed.

To increase the speed, of the engine 1, we depress the accelerator pedal 21, which moves the push rod 24 to the left and rotates the floating link 26 about the fulcrum 28, moving push rods 29 and 20 to the left; thereby opening the carburetor 13 and increasing the speed of the engine.

As the speed of the engine 1 increases, the speed of the refrigerant compressor 8 also increases proportionately; and, under certain conditions, this increased speed may result in the build up of abnormally high pressures within the condenser 10.

Whenever the pressure, in the condenser 10 and, consequently, bellows 33, reaches a higher value than that for which the tension spring 41 is adjusted, the bellows 33 expands and the fulcrum 28, of the floating link 26, moves to the left, whereby the floating link 26 now tends to rock about the end of the push rod 24 under the influence of the tension spring 46, which now pulls the push rod 29 to the right and allows the carburetor 13 to assume a throttled position; thereby reducing the speed of the engine 1 and refrigerant compressor 8.

If the pressure in the condenser 10 tends to a higher value, the bellows 33 further expands and further throttles the carburetor 13.

Whenever the pressure, within the condenser 10, resumes its normal value, the control components again assume their normal position.

From the foregoing, it will be seen that, with my invention, it will not be necessary for the driver to pay any attention to pressures within the refrigeration system since abnormally high condensing pressures will automatically slow up the automobile, as well as the refrigerant compressor, and give ample warning thereof. Since the operation is automatic, it will not depend upon the occasional driver who might not be sufficiently impressed by visual warning and who might not reduce, or sufficiently reduce the engine speed to a safe point.

While the foregoing is a specific embodiment of the invention, it will be recognized that various modifications may be employed, all within the spirit and scope of the invention, which is to be limited only to the claims hereto appended.

I claim:

1. In an automobile air conditioning system, the combination of a refrigerant vapor compressor driven by the automobile engine and compressing refrigerant vapor into a condenser, said automobile engine being fed with a motive fluid of varying quantity at the will of the operator and means to automatically reduce the maximum potential feed of the motive fluid in response to the occurrence of an abnormally high pressure within said condenser.

2. In an automobile air conditioning system the combination of a refrigerant vapor compressor driven by the automobile engine and compressing refrigerant vapor into a condenser, a carburetor supplying said engine with fuel under the influence of a foot actuated pedal which, by means of suitable linkage, is connected to a throttle valve incorporated within the carburetor, the said pedal normally allowing the said throttle valve to be operated between limits of minimum and maximum fuel flow therethrough, and means, automatically responsive to the occurrence of an abnormally high pressure within the condenser, to restrict the maximum fuel flow through said throttle valve.

3. In an automobile air conditioning system the combination of a refrigerant vapor compressor driven by the automobile engine and compressing refrigerant vapor into a condenser, a carburetor supplying said engine with fuel under the influence of a foot actuated pedal which, by means of suitable linkage, is connected to a throttle valve incorporated within the carburetor, the said pedal normally allowing the said throttle valve to be operated between limits of minimum and maximum fuel flow therethrough, and means, automatically responsive to the occurrence of an abnormally high pressure within the condenser, to restrict the maximum fuel flow through said throttle valve, said last named means biasing said linkage so that the said throttle valve cannot be opened to full position upon the occurrence of said abnormal condenser pressure.

ANTHONY F. HOESEL.